Jan. 4, 1944.   K. C. D. HICKMAN ET AL   2,338,583
HIGH VACUUM
Filed Sept. 17, 1941

KENNETH C. D. HICKMAN
JOHN C. HECKER
*INVENTORS*

BY Newton M. Perrins
Warren H. Cannon
*ATTORNEYS*

Patented Jan. 4, 1944

2,338,583

UNITED STATES PATENT OFFICE 2,338,583

HIGH VACUUM

Kenneth C. D. Hickman and John C. Hecker, Rochester, N. Y., assignors to Distillation Products, Inc., Rochester, N. Y., a corporation of Delaware Application September 17, 1941, Serial No. 411,188

10 Claims. (Cl. 230—92)

This invention relates to improved process and apparatus for producing high vacua and particularly for producing vacua below approximately .1 mm.

The only satisfactory method heretofore known for producing high vacua is by means of the condensation pump. These pumps involve the vaporization of a low vapor pressure substance such as mercury or organic compounds. The vapors are passed through a jet nozzle and gases to be pumped are entrained in the jet of vapors thus formed. Mercury has been almost completely displaced by certain organic compounds because of their lower vapor pressure. However, organic compounds are at least partially decomposed during vaporization. The decomposition products harmfully affect the vacuum produced. Also, these pumps are notoriously inefficient as far as energy consumption is concerned.

This invention has for its object to provide a new type of high vacuum pump which is free of one or more of the foregoing difficulties. Another object is to provide improved apparatus and procedure for producing high vacua. Other objects will appear hereinafter.

These and other objects are accomplished in accordance with our invention which includes pumping process and apparatus wherein a substance which is partially liquid at the temperature and pressure of utilization and which has a low vapor pressure is passed through a chamber in the form of a high velocity stream. The liquid is warmed or heated sufficiently to cause partial vaporization of the high velocity stream during passage through the chamber. Gases to be pumped are entrained in the liquid stream and vapors derived therefrom and are forced to flow to the opposite part of the chamber where they are separated from the liquid and removed from the system.

In the following examples and description we have given several preferred embodiments of our invention, but it is to be understood that these are set forth for the purpose of illustration and not in limitation thereof.

In the accompanying drawing

Figure 1:
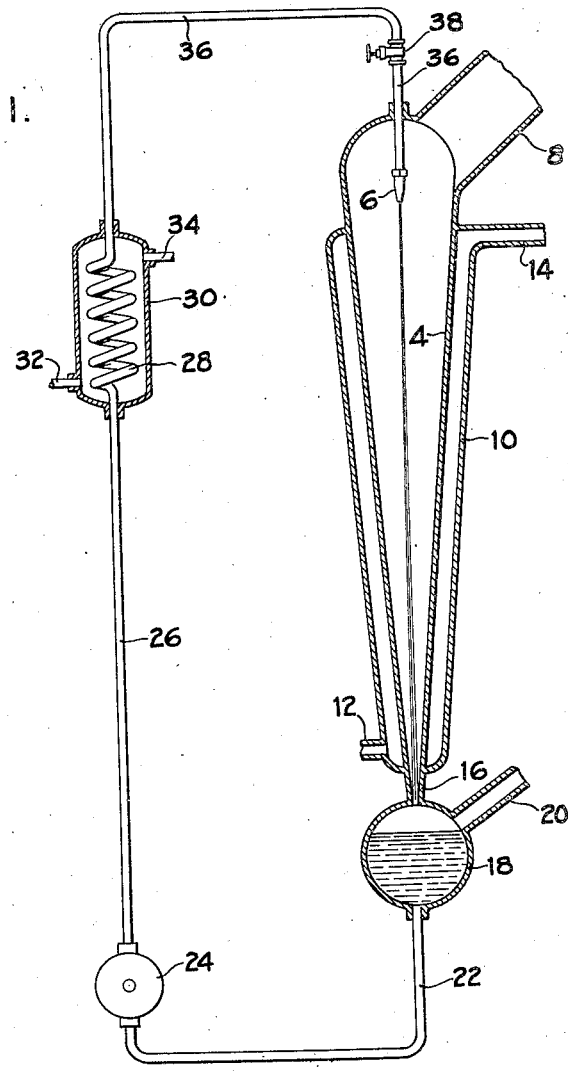
Figure 1 illustrates an elevation partly in section of our improved pump.

Referring to the drawing, numeral 4 designates an elongated tapered closed chamber having a circular cross section near the large end of which is located a jet nozzle 6 and an intake conduit 8 which connects to the system to be evacuated (not shown). Numeral 10 designates a jacket surrounding at least part of the diffusion chamber 4 which is provided with conduits 12 and 14 for introduction and withdrawal of cooling fluid. Numeral 16 designates the end of the diffusion chamber opposite to the nozzle 6 which is restricted. Numeral 18 designates a separating chamber or reservoir connected to the diffusion chamber 4 and located beyond the restriction 16. Numeral 20 designates a withdrawal conduit for removal of gases. This conduit is connected to a backing pump (not shown). Numeral 22 designates a conduit connected with the lower portion of chamber 18 which serves to convey liquid therefrom to high compression pump 24. Numeral 26 designates a conduit which serves to deliver compressed liquid (i. e., liquid under pressure) to heating coil 28 which is provided with a jacket 30 into which heating fluid is conveyed and removed from by way of conduits 32 and 34. Numeral 36 designates a conduit provided with a valve 38 which serves to deliver compressed and heated liquid to jet nozzle 6.

Figure 2:
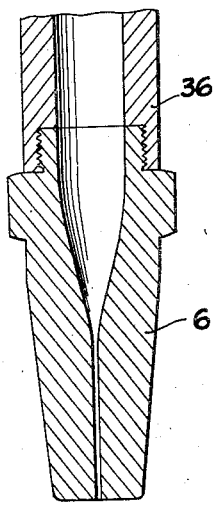
Figures 2 and 3 illustrate details of the pump nozzle construction.
Figure 3:
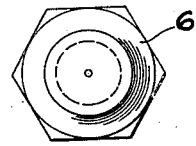

Referring particularly to Figures 2 and 3, it will be noticed that nozzle 6 has a small aperture and is streamlined so that a high velocity uniform stream of liquid is emitted. It is desirable that all the components of the stream have much the same directional movement and velocity.

In operating the apparatus illustrated, reservoir 18 is filled with a relatively low vapor pressure liquid. The backing pump (not shown) connected to conduit 20 is put into operation. Also compression pump 24 is started and heating fluid is delivered to heating jacket 30. Cooling fluid is introduced into conduit 12 and removed from conduit 14 of cooling jacket 10. Compressed heated liquid is ejected from jet nozzle 6 in the form of a high velocity stream. The character and speed of the stream can be adjusted by means of valve 38.

Due to the fact that the liquid is heated and also that a partial vacuum is produced in the system by the backing pump, the liquid stream is partially vaporized as it passes through chamber 4. However, the vapors derived from the liquid stream have a directional component and velocity substantially the same as that of the liquid stream. Gases to be pumped and diffusing into the chamber 4 through conduit 8 are entrained in the stream of liquid and in the stream of vapors derived therefrom. The mixture of gases, vapors and liquid passes to the opposite end of the chamber 4, through the restriction 16 and into the separating chamber 18. Gases are withdrawn through conduit 20 and the liquid in reservoir 18 is reused.

For highest efficiency it is desirable to cool the walls of the chamber 4 in order to prevent collection of vapors therein and consequent raising of the pressure. Condensate produced by the cooling will flow down the walls of chamber 4 into reservoir 18.

Also it is desirable to have the restriction 16 of approximately the same cross sectional area as that of the high velocity stream of liquid at that point. In this way the stream is made to act as a Venturi ejector, thus increasing the total pumping effect. However, this is a preferred construction and is not essential. An elongated chamber is preferred for the same reason. Any shape of chamber can be used which will expose a large area of the liquid or vapor stream to the diffusing gases to be pumped. The greater this area the better the pumping speed since the greater the area of pumping liquid and liquid vapor exposed to the diffusing gases, the more complete will be the removal of the gases. However, my invention is not restricted to any particular shape of chamber since circular, square, etc., chambers can be satisfactorily employed.

It will be apparent that many modifications can be made in the apparatus illustrated without departing from the spirit or scope of our invention. Thus while we have shown a streamlined nozzle other shapes may be used even though they give an imperfect stream with side spray. Also a multiplicity of nozzles 6 directed toward throat 16 may be used to improve the pumping action.

Any substance having a low vapor pressure such as below .1 mm. at room temperature and partially liquid at the temperature and pressure used is satisfactory as a working fluid. Since the vapor pressure of the liquid at the temperature of the condenser determines the degree of evacuation obtainable, it is best to use an operating liquid having a vapor pressure at least as low as the pressure to be produced in the system under evacuation. Examples of satisfactory operating liquids are low vapor pressure hydrocarbon fractions, and low vapor pressure petroleum fractions such as "Apieson" oils, low vapor pressure glycerides such as castor oil, phthalates such as dimethyl, diethyl, dipropyl, diamyl, dihexyl, and dioctyl, and similar diesters of sebasic acid, etc.

It is best that the velocity of the liquid and vapor stream or jet be as high as possible since the pumping speed is proportional to the velocity. Excellent results are obtained by using a liquid stream having a velocity which is about $\frac{1}{10}$ to 2 times, and preferably about $\frac{1}{2}$ to 1 times, the mean velocity of translation of the molecules of vaporized working fluid at the temperature at which they are vaporized in the pump. This mean velocity of translation is due to the kinetic energy of the vapor molecules and resultant random motion, and can be calculated by using the well known formula:

$$15,000 \times \sqrt{\frac{T}{M}} = \text{mean velocity of translation in cm. per second.}$$

M = molecular weight of pump fluid.
T = temperature of the vapors of pump fluid on the absolute scale.

For example the pump works well with dibutyl phathalate heated to 120° C. The molecular weight of dibutyl phthalate is 278 therefore:

$$15,000 \times \sqrt{\frac{393}{278}} = 17,850 \text{ cm. per second}$$

The mean velocity of translation should not be confused with the forward or impressed velocity of the liquid and vapor stream. The impressed velocity is distinct therefrom since it is not due to the kinetic energy of the molecules but is entirely due to the artificial substantially monodirectional velocity imparted by the pump mechanism. Lower or higher impressed velocities than those mentioned will work satisfactorily, and while they are not in general attractive from an economic viewpoint they are to be understood as being within the scope of our invention.

One of the main advantages of this type of pump is that it will operate effectively against relatively high backing pressures such as, for instance, ½ of an atmosphere. However, the efficiency is greater with somewhat lower backing pressures such as 150 mm. or less. Obviously the lowest possible backing pressures can be used, but there is no economical advantage in using backing pressures below about 5 mm.

The temperature to which the operating fluid should be heated before passing through the jet nozzle depends upon the particular operating liquid utilized and, of course, the backing pressure. This temperature is in no way critical, but it is essential that the liquid be heated to cause partial vaporization during passage through the diffusion chamber. Vaporization of between about 1 and 50% of the liquid will be found to be in general most satisfactory. However, higher or lower amounts of vaporization will result in useful pumping and our invention is to be understood to include them within its scope.

It is difficult to obtain an absolutely pure organic pump fluid. Also, such fluids become contaminated during use due to decomposition or intermixture with vapors from the system under evacuation. Therefore, we contemplate providing our improved pump with means for fractionating the pump fluid and separating harmful components. The useful components are then returned for use in the pump. This may be accomplished by means of a separate fractionator working continuously or discontinuously with the pump or by providing the conduit 20 with re-entrant rings for fractionating and retaining the most volatile components.

What we claim is:

1. The process of producing a high vacuum in a closed system which comprises in combination ejecting a high velocity stream of a heated, relatively low vapor pressure organic liquid through a closed chamber to which is connected the system to be evacuated, said heated liquid being at a temperature sufficient to cause partial vaporization of the liquid when it is ejected into the chamber, entraining gas from the system to be evacuated in the liquid and vapor stream, and separating the gases from the liquid and vapor at a remote point.

2. The process of producing a high vacuum in a closed system which comprises in combination ejecting a high velocity stream of a heated, relatively low vapor pressure organic liquid through a closed chamber, which is connected to the system to be evacuated and the walls of which are cooled, said heated liquid being at a temperature sufficient to cause partial vaporization of the liquid when it is ejected into the chamber, entraining gases from the system to be evacuated in the liquid and vapor stream and separating the gases from the liquid and vapor at a remote point.

3. The process of claim 2 in which the velocity of the liquid stream is at least 1/10 the mean velocity of translation of the molecules of vaporized pump fluid.

4. The process of producing a high vacuum in a closed system which comprises in combination ejecting a high velocity stream of a heated, relatively low vapor pressure organic liquid longitudinally through a closed elongated chamber which is connected to the system to be evacuated, such liquid being introduced at the end of the chamber and being directed toward a restricted opening at the opposite smaller end of the chamber, and said liquid being at a temperature sufficient to cause partial vaporization of the liquid during its passage through the chamber, entraining gas from the system to be evacuated in the liquid and vapor stream, cooling the liquid vapor gas mixture, separating the gases from the liquid, removing the separated gases from the system and returning the liquid for reuse in the process.

5. The process of claim 4 in which the velocity of the liquid stream is at least 1/10 the mean velocity of translation of the molecules of vaporized pump fluid.

6. The process of claim 4 in which the gases, vapors and liquid are collected in a collecting chamber positioned beyond the small end of the diffusion chamber.

7. A high vacuum pump adapted to evacuate closed systems to low absolute pressures comprising in combination a closed chamber, a liquid jet nozzle of small aperture located near one end of the chamber, and directed toward the opposite end of the chamber, a collecting and separating means for liquid and entrained gases at the end of the chamber opposite to the nozzle said collecting and separating means containing a low vapor pressure organic liquid, means for compressing such collected liquid, means for heating collected liquid, means for conveying compressed and heated liquid to the nozzle for reuse and an exhaust port for removing the entrained gases from the collecting and separating means.

8. A high vacuum pump adapted to evacuate closed systems to low absolute pressures comprising in combination an elongated, tapering closed chamber, a liquid jet nozzle of small aperture located near the largest end of the chamber, and directed toward the opposite and small end of the chamber, means positioned beyond the small end of the chamber for collecting and separating liquid from entrained gases, an exhaust port for removing gases therefrom, means for compressing collected liquid to such an extent that it will issue from said jet nozzle with a velocity at least equal to one-tenth the mean velocity of translation of the molecules of liquid vapor, means for heating collected liquid, and means for conveying compressed and heated liquid to the liquid jet nozzle for reuse.

9. A high vacuum pump adapted to evacuate a closed system to low absolute pressure comprising in combination a closed chamber, means for cooling at least part of the walls of said chamber, a liquid jet nozzle of small aperture located near one side of the chamber and directed toward the opposite side of the chamber, means for collecting and separating liquid and entrained gases at the side of the chamber opposite to the nozzle, said collecting and separating means containing a low vapor pressure organic liquid, means for compressing such collected liquid, means for heating the compressed liquid, means for conveying the compressed and heated liquid to the jet nozzle for reuse, and an exhaust port for removing the entrained gases from the gas and liquid collecting means.

10. A high vacuum pump adapted to evacuate a closed system to low absolute pressure comprising in combination an elongated tapering closed chamber, the small tapered end of which is provided with means for cooling the walls thereof, a liquid jet nozzle with small aperture located near the largest end of the chamber and directed toward the opposite and small end of the chamber, means positioned beyond the small end of the chamber for collecting and separating liquid from entrained gases, said collecting and separating means containing a low vapor pressure organic liquid, an exhaust port for removing separated gases, means for compressing collected liquid, means for heating collected liquid, and means for conveying compressed and heated liquid to the liquid jet nozzle for reuse.

KENNETH C. D. HICKMAN.
JOHN C. HECKER.